No. 640,765. Patented Jan. 9, 1900.
W. HELM.
COOLING OR REFRIGERATING APPARATUS.
(Application filed Dec. 13, 1898.)
(No Model.)
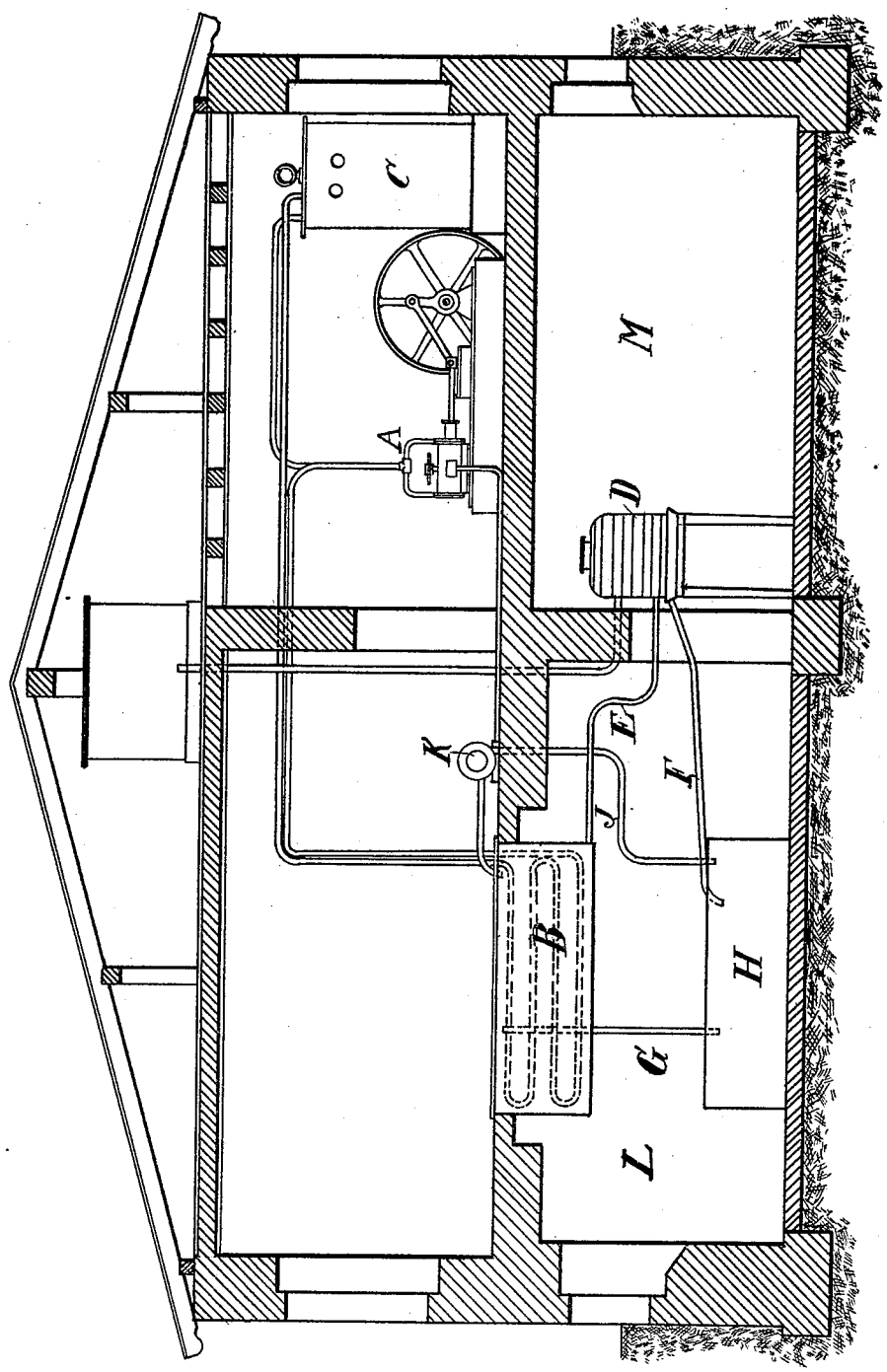
WITNESSES:
Fred White
Thomas F. Wallace
INVENTOR:
Wilhelm Helm,
By his Attorneys:

United States Patent Office.

WILHELM HELM, OF BERLIN, GERMANY.

COOLING OR REFRIGERATING APPARATUS.

SPECIFICATION forming part of Letters Patent No. 640,765, dated January 9, 1900.

Application filed December 13, 1898. Serial No. 699,110. (No model.)

*To all whom it may concern:*

Be it known that I, WILHELM HELM, engineer, a subject of the German Emperor, residing at Berlin, Germany, have invented certain new and useful Improvements in Cooling or Refrigerating Apparatus; and I do hereby declare the following to be a full, clear, and exact description of the invention, such as will enable others skilled in the art to which it appertains to make and use the same.

This invention relates to a refrigerating and cooling apparatus for dairies and other small plants, and one of its essential features is that the refrigerating liquid of the ice-maker besides being used for the formation of ice serves also directly to cool a chamber and a liquid.

In the refrigerating or cooling apparatus used in breweries, slaughter-houses, and the like the walls of the ice-machines are always carefully insulated by heat-insulating materials or covers, so as to prevent as much as possible a loss of cold. The cooling of the storage-rooms or the liquid to be cooled is effected by means of cooling liquid or cooled fresh water circulating through pipes. The freezing and cooling apparatus for the manufacture of Cassé's ice-milk are similarly arranged. In these apparatus it is, for instance, required, first, to freeze the milk; second, to cool the milk to a low temperature, and, third, to keep a storage-room cold. In such plant is provided an ice-making machine which must be carefully insulated, so as to avoid loss of cold. Furthermore, a fresh-water cooler is required for the purpose of obtaining cold fresh water to be used for the cooling of the fresh milk. Furthermore, in the milk-cooling chamber a system of pipes is arranged in the well-known manner for the purpose of cooling the storage-room for the preservation of the ice-milk. In my arrangement the system of pipes for cooling the milk-cooling or storage room is entirely eliminated. For this system of pipes is substituted the cooling-surface of the ice-maker, which is so located in the upper part of the cooling-chamber that the walls heretofore insulated project into the cooling-chamber. Consequently the insulation of the ice-maker is likewise obviated. Furthermore, for the purpose of eliminating the fresh-water cooler and the fresh-water basin and likewise the insulation of these parts the cooling liquid required for the cooling of the milk is drawn directly from the ice-maker and passes then to the cooling device and thence into a receptacle, from which it is forced back into the ice-maker by a pump. The receptacle may be located in the storage or milk-cooling chamber or outside. As soon as the cooling liquid is forced back from the receptacle into the ice-maker the compressor is started in order to cool again the cooling liquid. A plant of this character adapted for use in a dairy is shown in the annexed drawing.

The compressor A is connected in the well-known manner with the ice-maker B and the condenser C. The ice-maker is so arranged in the upper part of the storage-room L that its non-insulated outer walls serve as cooling-surfaces for said storage-room L. The cooling liquid in the ice-maker may flow through a pipe E to the coolers D, located in the creamery-room M, from which it passes into the receptacle H. From this receptacle H the cooling liquid is forced back into the ice-maker B by the pump K through the pipe J in order to be cooled again. The ice-maker B is connected with the receptacle H by a pipe G, through which passes the air from the receptacle into the ice-maker as soon as the cooling liquid is drawn from the latter, or, vice versa, from the ice-maker into the receptacle when the cooling liquid is forced back from the receptacle into the ice-maker.

The operation of such plant in a dairy is as follows: The fresh milk is cooled to a low temperature partly by well-water and partly by the cooling liquid of the ice-maker. As soon as this operation is finished the cooling liquid collected in the receptacle is forced back into the ice-maker, whereby the ice previously formed in the freezing-cavities is partly melted and the liquid thus cooled again to some extent, so that the loss of cold caused by melting in thawing-cavities is decreased. The compressor is then brought in operation in order to cool again the cooling liquid heated by the cooling of the milk. If the temperature necessary for the formation of ice is reached, the manufacture of ice is commenced.

The cooling liquid in the ice-maker will keep the storage-room sufficiently cool, owing to the abundant supply of cold, even if the compressor is not continually in operation.

Such plant is also adopted for use in small breweries, and the ice-maker can then be used for cooling the fermentation and storage room.

What I claim is—

1. In a freezing and cooling plant for dairies and the like the combination with a freezing-room and an adjacent cold-storage room, of an ice-machine located in and accessible from the freezing-room, and having its uninsulated walls extended through the partition between said rooms.

2. In a freezing and cooling plant for dairies and the like the combination with a freezing-room, an adjacent cold-storage room, and a cooling-room, of an ice-machine located in and accessible from the freezing-room, and having uninsulated walls extending into said cold-storage room, coolers in said cooling-room connected to said ice-machine, and a pump for forcing the cooling liquid back to said machine.

3. In a freezing and cooling plant for dairies and the like, the combination with a cold-storage room, of a refrigerating-machine located at the top of said room, and having its under walls uninsulated.

4. The combination in a cooling plant for dairies and the like, of a cold-storage room, having a refrigerating-machine located at the top, said machine having its lower walls uninsulated, coolers connected with the said machine, a tank located below said machine and connected thereto and a pump, whereby the liquid descends from such machine to the coolers and thence to the tank, from which it is again forced to said machine by said pump.

In testimony whereof I affix my signature in presence of two witnesses.

WILHELM HELM.

Witnesses:
ERWIN L. GOLDSCHMIDT,
MAX. C. STACHLE.